(12) United States Patent
McAllister et al.

(10) Patent No.: US 6,463,506 B1
(45) Date of Patent: Oct. 8, 2002

(54) ARRANGEMENT OF DATA WITHIN CACHE LINES SO THAT TAGS ARE FIRST DATA RECEIVED

(75) Inventors: Curtis R. McAllister, Sunnyvale; Robert C. Douglas, Santa Clara; Henry Yu, San Jose, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/562,592

(22) Filed: Apr. 29, 2000

(51) Int. Cl.$^7$ .............................................. G06F 12/00
(52) U.S. Cl. ............................ 711/118; 711/3; 711/145; 711/144
(58) Field of Search .............................. 711/118, 3, 121, 711/122, 135, 145, 144; 710/113; 712/213

(56) References Cited

U.S. PATENT DOCUMENTS

| | | | | |
|---|---|---|---|---|
| 5,025,365 A | * | 6/1991 | Mathur et al. ............... | 711/121 |
| 5,067,071 A | * | 11/1991 | Schanin et al. ............. | 710/113 |
| 5,398,325 A | * | 3/1995 | Chang et al. ................. | 711/3 |
| 5,737,757 A | * | 4/1998 | Hassoun et al. ............. | 711/145 |
| 5,835,949 A | * | 11/1998 | Quattromani et al. ....... | 711/135 |
| 5,903,908 A | * | 5/1999 | Singh et al. ................. | 711/122 |
| 6,049,851 A | | 4/2000 | Bryg et al. .................. | 711/141 |
| 6,092,182 A | * | 7/2000 | Mahalingaiah .............. | 712/213 |

OTHER PUBLICATIONS

M. Papamarcos and J. Patel "A Low Overhead Coherent Solution for Multiprocessors with Private Cache Memories" in Proceedings of the 11th International Symposium on Computer Architecture, IEEE, New York (1984), pp. 348–354.

* cited by examiner

*Primary Examiner*—David Hudspeth
*Assistant Examiner*—Fred F. Tzeng

(57) ABSTRACT

A memory system includes a main memory controller supplying data in response to transactions received by the main memory controller. A plurality of modules each include a cache memory for storing data supplied by the main memory controller. The modules request data from the main memory controller by sending module generated transactions to the main memory controller. A cache tag array includes a cache tag corresponding to each data line stored in memory, there being a one-to-one correspondence between the cache tags and the data lines. The data lines together with their associated cache tags are combined and arranged in a plurality of sequential data chunks, the cache tags included in an initial portion of the data chunks (i.e, a first sequence of bits) followed by inclusion of the data lines in a subsequent portion of the data chunks (i.e., the usable bit positions following inclusion of all of the cache tag bits.) Each of the chunks may further include appropriate ECC bits. By this arrangement, all of the cache tags are transferred between the main memory controller and the plurality of modules prior to transfer of the bits constituting the data lines so that any coherency operations may be initiated without waiting to receive the remaining data of the data line.

16 Claims, 2 Drawing Sheets

FIG. 1
(PRIOR ART)

| CHUNK | BITS | | |
|---|---|---|---|
| | 9 | 7 | 128 |
| 0 | ECC | TAGS | DATA 127-0 |
| 1 | ECC | TAGS | DATA 255-128 |
| 2 | ECC | TAGS | DATA 383-256 |
| 3 | ECC | TAGS | DATA 511-384 |

FIG. 2

| CHUNK | BITS | | |
|---|---|---|---|
| 0 | ECC 8-0 | TAGS 27-0 | DATA 127-21 |
| 1 | ECC 8-0 | DATA 20-0 | DATA 255-142 |
| 2 | ECC 8-0 | DATA 141-128 | DATA 383-263 |
| 3 | ECC 8-0 | DATA 262-256 | DATA 511-384 |

ARRANGEMENT OF DATA WITHIN CACHE LINES SO THAT TAGS ARE FIRST DATA RECEIVED

TECHNICAL FIELD

This application relates in general to LSI circuit design and is specific to data organization within cache lines.

BACKGROUND

In a multiprocessor system, problems arise when more than one processor attempts to access a memory location. While multiple processors can access a single memory location, if one of those processors attempts to update the information in the memory location without informing the other processors who also have access to the specific memory location, data mismatches may occur. Multiprocessor systems typically use memory cache which is associated with each processor. These local memory locations are typically called processor cache. Examples of such an architecture are set forth in U.S. Pat. No. 6,049,851 entitled "Method and Apparatus for Checking Cache Coherency in a Computer Architecture" and U.S. Pat. No. 5,737,757 entitled, "Cache Tag System for use with Multiple Processors Including the Most Recently Requested Processor Identification", both patents are assigned to the owner of the present invention, and are incorporated herein by reference in their entirety.

Within the processor cache, the processor may store information as recently accessed. Processor cache is typically separated out into cache lines. A cache line is typically 64, 128, or 256 bytes of data. Therefore, when a processor attempts to access a specific memory location it first searches its cache to determine if it already has a copy of the information stored for that memory location. If the memory location is not currently stored in the processor cache, the processor attempts to obtain a copy of that memory location from main memory. If the memory location is available in the processor cache, the processor will use the cache for its copy. Issues arise when multiple processors attempt to access the same memory location.

Numerous protocols exist which attempt to reduce or eliminate memory contentions between processors. One such protocol is called MESI. MESI stands for Modified, Exclusive, Shared, Invalid and is described in detail in M. Papamarcos and J. Patel "A Low Overhead Coherent Solution for Multiprocessors with Private Cache Memories" in Proceedings of the 11th International Symposium on Computer Architecture, IEEE, New York (1984), pp. 348–354, incorporated herein by reference. Under the MESI protocol, a cache line is categorized according to its use. A modified cache line indicates that the particular line has been written to by a processor in which case the data has been modified. An exclusive cache line indicates that one specific processor has exclusive access to the line so that it can modify the information contained within that memory location if desired. A shared cache line indicates that more than one processor has access to that memory location. The information in that memory location could also currently be stored in more than one processors' cache. A shared cache line is considered "read only" and any processor with access to the memory location can not modify or write to that memory location. An invalid cache line identifies a particular processor's cache which is invalid i.e., may no longer be current. While MESI is a standard term in the industry, other classifications of nomenclature are frequency employed. Modified cache lines are typically referred to as private dirty. Exclusive cache lines are typically referred to as private cache lines. Private cache lines which have not been modified are typically referred to as private clean cache lines.

If a processor requires access to a specific memory location it will first check its processor cache to determine if the information is available there. If the information is not currently contained within the processor's cache, the processor will go to main memory to access the information. Before allowing the processor access to a memory location, the cache coherency controller will determine what access to the memory location is available. If a processor desires exclusive or private use of a cache line, it is the function of the cache coherency controller to make sure that no other cache in the system has a valid copy of that line. Only one processor will be allowed exclusive or private access to a memory location at a time. If a cache coherency controller has characterized a specific cache line as read only or shared, potentially every processor or every processor cache in the entire system could have a copy of that line. Difficulties arise, however, if one of the processors needs to update the information within that cache line.

In order for a processor to update or modify information within the specific memory location it must have exclusive access to a memory location. If the memory location is currently categorized as read only, a processor that needs to update or otherwise modify the information must make a request for exclusive access to the memory location. The cache coherency controller then determines which other processors or which other processor cache currently have access to the memory cache line and makes the necessary arrangements for the requesting processor to have exclusive use of the memory cache line.

One method for a processor to obtain the exclusive use of a cache line is for the cache coherency protocol to invalidate other copies of other processor's access to the memory line cache currently in use. Once other processors access to the memory cache line has been invalidated, the remaining processor has exclusive use of the data and can modify the data as required.

Early attempts at cache coherency included write-through caches that ensured that information was updated simultaneously in memory and in other processor caches. Alternately, if all processors have access to a common memory bus, each processor can listen in or "snoop" on the bus for potentially conflicting requests by other processors for exclusive use of the memory location. Once a processor snooped another processor's request for memory location that the former currently had access to, it could determine that a potential memory conflict may exist. However, snooping requires a common system bus so that every processor could see every other processor's traffic and make sure the memory they currently have access to was not affected. Snooping also increases overhead, and provides the potential for errors if a message is missed.

Another method of cache coherency is a full directory-based system where rather than sending each transaction to every other agent or other processor in the system a table is maintained which indicates a processor's access to various cache lines. Regardless of the method used, the job of the cache coherency protocol is to make sure that if there are any caches in a system, especially cache between a processor and a memory, or between system input and output and a memory, and a processor has exclusive use of the line: no other cache has a valid copy of the same exclusive line. Cache coherency controllers can be implemented by processors or by memory.

SUMMARY OF THE INVENTION

According to one aspect of the invention, a memory system includes a main memory controller supplying data in response to transactions received by the main memory controller. A plurality of modules each include a cache memory for storing data supplied by the main memory controller. The modules request data from the main memory controller by sending module generated transactions to the main memory controller. A cache tag array includes a cache tag corresponding to at least each data line stored in one of the cache memories of the modules, there being a one-to-one correspondence between the cache tags and the data lines. The data lines together with their associated cache tags are combined and arranged in a plurality of sequential data chunks, the cache tags included in an initial portion of the data chunks (i.e, a first sequence of bits) followed by inclusion of the data lines in a subsequent portion of the data chunks (i.e., the usable bit positions following inclusion of all of the cache tag bits.) By this arrangement, all of the cache tags are transferred between the main memory and the main memory controller prior to transfer of the bits constituting the data lines.

According to a feature of the invention, each of the data chunks includes error correction code (ECC) data for detecting and correcting bit errors of the respective data chunk.

According to another feature of the invention, the cache tag array is coupled to the main memory controller. Further, each of the cache tags specify the module that most recently requested the data line or all of the modules that contain shared copies, preferably independent of whether or not a previous request for the data line has been completed.

According to another feature of the invention, the cache tag array includes information specifying the cache coherency status of each of the data lines that is stored in one of the cache memories.

According to another feature of the invention, the memory controller sends a controller generated transaction requesting one of the data lines to one of the modules when the module receiving the controller generated transaction has a private copy or shared copy of the data line and the data line has been requested by another of the modules. The controller generated transaction identifies the requested data line and the module requesting the data line, the module receiving the controller generated transaction returning the data line or response indicating that no copy of the line exists, and a code identifying the module requesting the data line to the memory controller in a module generated transaction. The main memory controller directs the data line received in one of the module generated transactions to the module identified by the code when the memory controller receives the data line from one of the modules in response to one of the controller generated transactions.

According to another aspect of the invention, a memory system includes a memory controller configured to supply data in response to transactions received by the memory controller. A plurality of modules each having a cache memory for storing data supplied to each of the modules by the memory controller, request data from the memory controller by sending module generated transactions to the memory controller. A memory stores n bit data lines each including (i) p data bits and (ii) q cache tag bits corresponding to the data bits. Each of the data lines is arranged or partitioned into first through r sequential chunks of s bits each wherein n, p, q, r and s are integer values greater than one. An initial portion of the sequential chunks forming one of the data lines including the p cache tag bits and a subsequent portion of the chunks including the n data bits.

According to another feature of the invention, the chunks further includes t bits of respective error correction code.

According to another feature of the invention, the first sequential chunk includes all of the q cache tag bits. Alternatively, if there is insufficient space to include all of the cache bits in the first chunk, then the next sequential chunk or chunks may be used such that the first through $i^{th}$ of the sequential chunks includes the q cache tag bits and the $i^{th}$ (or $(i+1)^{th}$) through $r^{th}$ of the sequential chunks includes the p data bits.

According to another feature of the invention, the memory controller is responsive to a receipt of the q cache bits to initiate a coherency operation. Preferably, the coherency operation is initiated prior to a receipt of all of the p data bits associated with the q cache bits.

According to another feature of the invention, each of the chunks further includes t bits of error correction code. A first one of the chunks additionally includes the q cache tag bits and s-(q+t) ones of the p data bits while subsequent ones of the chunks additionally include s-t of the p data bits.

According to another aspect of the invention, a method of maintaining cache memory coherency includes storing n bit data lines each including (i) p data bits and (ii) q cache tag bits corresponding to the data bits. Each of the data lines is arranged in first through r sequential chunks of s bits each wherein n, p, q, r and s are integer values greater than one. An initial portion of the sequential chunks forming one of the data lines includes the p cache tag bits and a subsequent portion of the chunks include the n data bits. In response to a step of sending transactions requesting data, data stored in a memory is supplied as one or more of the data lines, each data line supplied as a sequence of the sequential chunks.

According to another feature of the invention, a step of receiving the first sequential chunk is performed prior to receiving others of the sequential chunks. In response, a coherency operation is initiated prior to a receipt of all r of the sequential chunks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 1 shows a prior art memory line layout of a cache line;

FIG. 2 shows a preferred embodiment of the memory line layout of the present invention;

DETAILED DESCRIPTION

Figure 3:
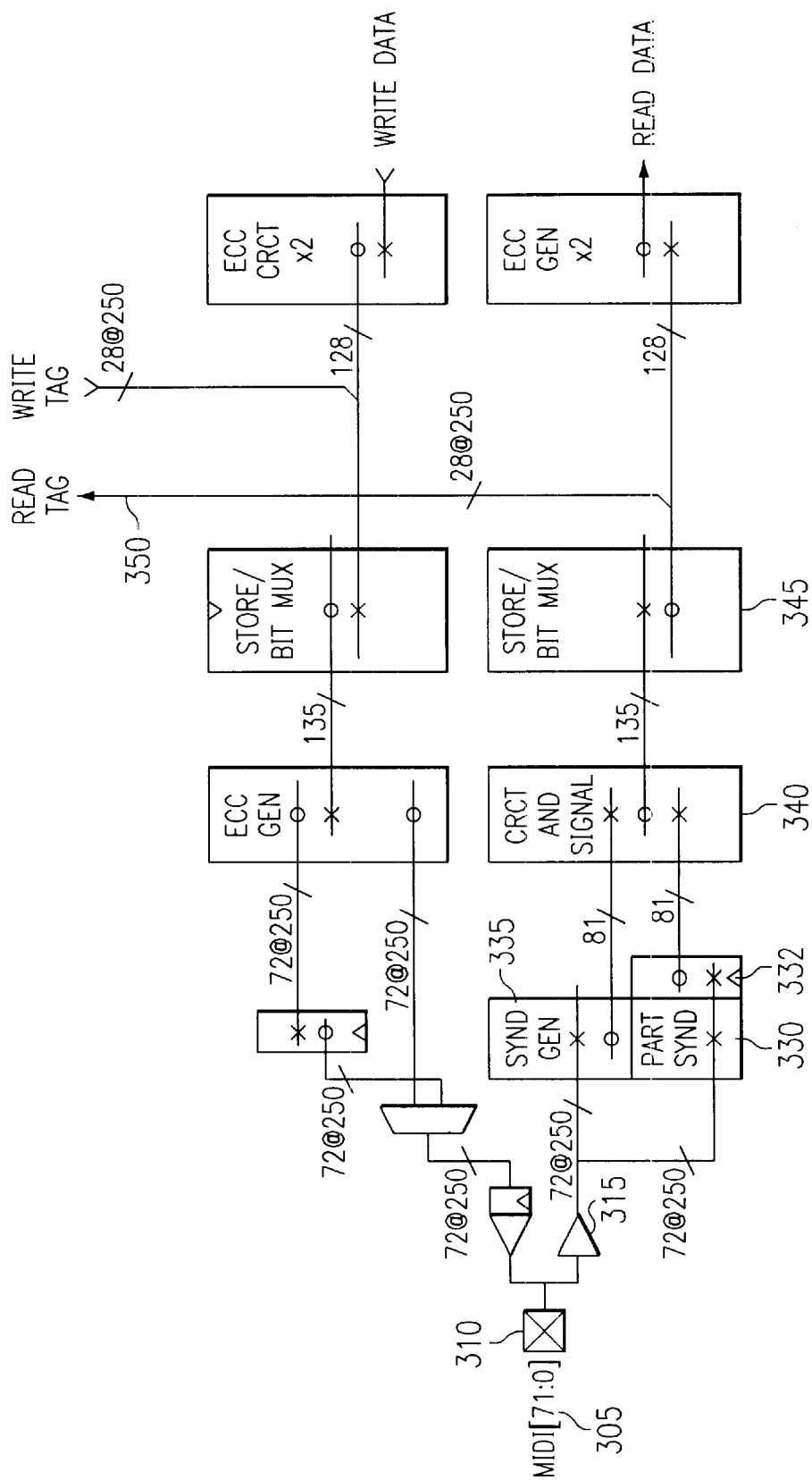
FIG. 3 shows a circuit diagram which uses the ECC data and splits off the tag data.

Referring to FIG. 1, a cache line can consist of 576 bits. Associated with these 576 bits is error correction code (ECC) and tag information. So a typical memory line is composed of these three separate entities, ECC, tags and payload data. Error correction codes ensures the accuracy of the data that's been read from memory. Nine bits of ECC are required to check 144 bits of data. FIG. 1 shows a cache line divided into four 144 bit chunks, each chunk including the required 9 bits of ECC information. When the cache line is read from memory, if a bit has been flipped or is incorrect (e.g., due to alpha particle strikes on the dynamic random access memory or radiation), a mathematical computation can be performed in the hardware, using the ECC information, to determine which bit is incorrect and to determine the necessary correction to ensure that the information is accurate. FIG. 1 indicates that nine (9) bits are devoted to error correction code (ECC). The next seven (7) bits in each chunk are devoted to tags. Tags are the portion of the chunk which ensures coherency of the data between this processor and other processors which have access to the memory information. The tags, as previously described, allow a memory location to be classified as either exclusive or shared. Tags also indicate the processor's capabilities with respect to these memory locations. The remaining 128 bits in each ECC word are payload data. So each chunk of FIG. 1 consists of 128 bits of payload data, 7 bits of tag information and 9 bits of ECC. One skilled in the art would also recognize that each chunk of the memory line consists of 16 bytes of payload data and 2 bytes (total) of tag and ECC data. So each chunk of data consists of 18 bytes.

The ECC within each chunk of data is specific to that chunk of data. Nine bits of data can identify and correct one erroneous bit within the 144 bits. Two erroneous bits in the 144 bits of data results in a fatal error which cannot be corrected with 9 bits of ECC. While ECC may use more bits to correct errors, the use of additional bits complicates the computations and requires additional hardware resources. Once chunk zero is obtained from memory, the ECC bits included within chunk zero can be used to check and, if necessary, correct an error in that chunk of information.

Twenty-eight bits of tag information is included within the memory line layout of FIG. 1. While this tag information is spread evenly across the four chunks of data in FIG. 1, all twenty-eight bits of tag information is specific to the entire 64 bytes of payload data. The tag information is not specific to the chunk, but rather to the cache line itself which consists of all of the data included in all four chunks of the memory line layout.

Overall, the memory line layout of FIG. 1 contains 36 bits of ECC information, 28 bits of tag information, and 512 bits of payload data.

As described previously, before a cache line can be used by a processor or another device, the tag information must be checked to determine the status of the cache line. If another processor or device has exclusive use of the cache line, the cache coherency controller will need to issue a recall to the owner of the current cache line before they can allow access to the cache line by another processor or device. Therefore, when accessing a cache line which is configured as shown in FIG. 1, the cache coherency controller must receive and interpret all four chunks of data before memory contentions are identified. If a computer cycle was used to access each chunk of data, four computer cycles would be used before the cache coherency controller actually had acquired all the data necessary to determine the tag information. After the cache coherency controller received each of the chunks, the cache coherency controller would also perform ECC on each of the sets of 144 bits. Only upon completion of the ECC checks for all four chunks would a cache controller be assured that the correct tag information was available. So in this example, four cycles were required to read the four chunks of data, and four ECC checks and optional corrections were required before valid tag information was available. Once the correct tag information was acquired, the cache coherency controller could then resolve any conflicts of ownership pertaining to the cache line.

Referring now to FIG. 2, changing the order in which the ECC information, the tag information, and the payload data, is recorded within the memory line layout has numerous advantages. As described previously, the 9 bits of ECC information is specific to, and required to remain within, each 144 bit chunk of data. However, by moving all 28 bits of tag information within the first chunk of data, several benefits result. The remaining 107 bits of chunk 0 is filled with payload data. If the cache coherency controller requires one cycle to read each chunk of data, the memory line layout of FIG. 2 requires only a single cycle for the cache coherency controller to acquire all tag information. Additionally, a single ECC check is required to check the information. Once the cache coherency controller acquires all of the tag information, the cache coherency controller may then identify and begin to resolve contentions with other processors or devices for ownership of the affected cache line. Each succeeding chunk of the cache line as shown by FIG. 2 of the memory line layout still includes its 9 bits of ECC information. The remaining available bits in chunks 1, 2 and 3 are used to hold the remaining bits of payload data.

When a 72 bit memory data bus is used to access a cache line, 8 nanoseconds (ns) are required for each 144 bit chunk of data to be read or written. Referring back to FIG. 1, the cache coherency controller required at least 32 ns before all of the tag information was acquired. In comparison, FIG. 2, requires only 8 ns before all of the tag information is acquired by the cache coherency controller. An advantage to the reorientation of data within the line cache in a memory line layout is a subsequent savings of 24 ns in the acquisition of the tag information. This savings allows the cache coherency controller to begin resolving contentions for the memory location earlier. Additional time is saved because FIG. 2's system can use the information after a single ECC check.

Referring now to FIG. 3, the 144 bits of chunk 0 of FIG. 2 is divided in two clock cycles and 72 bits appear on the first clock cycle, with 72 bits appearing on the second clock cycle. The 72 bits of data come in on MID1 305 of FIG. 3. The data comes through the receiver 315. After exiting the receiver 315, the 72 bits of data enter the partial syndrome generator 330. Mathematical computations are performed on the first 72 bits and the result is stored in register 332. On the next cycle, the second set of 72 bits enters syndrome generator 335, has mathematical computations performed on these 72 bits and are combined with the bits stored in register 332. The partial syndrome generator 330 and syndrome generator 335 perform their precalculations for error detection. The 144 bits are then fed into a correct and signal block 340. If an error has been detected through the use the ECC bits, the faulty bit is corrected within the correct and signal block 340. At this point, the 9 bits of ECC data have been stripped off and are no longer necessary. The remaining 135 bits are passed to the store/bit multiplexer 345. The store/bit multiplexer 345 splits the bits that can be used immediately from the bits that need to be stored until additional data is acquired. When chunk 0 of the cache line is received, and the 9 bits of ECC data have been stripped off, the 28 bits of tag data can be used immediately and the remaining 107 bits of data need to be stored until the rest of the data is received. The 28 bits of tag data are sent via line 350 for identification and elimination of contentions for the cache line.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A memory system, comprising:
    a main memory controller for supplying data in response to transactions received by said main memory controller;
    a plurality of modules, each of said modules having a cache memory for storing data supplied to each of said modules by said main memory controller, each of said modules requesting data from said main memory controller by sending module generated transactions to said main memory controller; and
    a cache tag array including a cache tag corresponding to at least each data line stored in one of said cache memories of said modules, wherein
        said data lines and corresponding ones of said cache tags are combined and arranged in a plurality of sequential data chunks, said cache tags included in an initial portion of said data chunks followed by inclusion of said data lines in a subsequent portion of said data chunks whereby said cache tags are transferred between said main memory controller and said plurality of modules prior to transfer of said data lines, and wherein each of said data chunks includes error correcting code data.

2. The memory system according to claim 1 wherein said cache tag array is coupled to said main memory controller.

3. The memory system according to claim 1 wherein each of said cache tags specify at least one module that has a copy of said data line corresponding to said cache tag from said main memory controller.

4. The memory system according to claim 3, wherein each of said cache tags specify at least one module that has a copy of said data line corresponding to said cache tag from said main memory controller independent of whether or not a previous request for said data line has been completed.

5. The memory system according to claim 1, wherein said cache tag array includes information specifying the cache coherency status of each of said data lines that is stored in one of said cache memories.

6. The memory system according to claim 1, wherein said memory controller sends a controller generated transaction requesting one of said data lines to at least one of said modules when said module receiving said controller generated transaction has a copy of said data line and said data line has been requested by another of said modules, said controller generated transaction identifying said requested data line and said module requesting said data line, said module receiving said controller generated transaction returning said data line and a code identify said module requesting said data line to said memory controller in a module generated transaction, and wherein said main memory controller directs said data line received in one of said module generated transactions to said module identified by said code when said memory controller receives data line from one of said modules in response to one of said controller generated transactions.

7. A memory system, comprising:
    a memory controller for supplying data in response to transactions received by said memory controller;
    a plurality of modules, each of said modules having a cache memory for storing data supplied to each of said modules by said memory controller, each of said modules requesting data from said memory controller by sending module generated transactions to said memory controller, and
    a memory storing n bit data lines each including (i) p data bits and (ii) q cache tag bits corresponding to said data bits, each of said data lines arranged in first through r sequential chunks of s bits each wherein n, p, q, r and s are integer values greater than one, an initial portion of said sequential chunks forming one of said data lines including said p cache tag bits and a subsequent portion of said chunks including said n data bits, and wherein each of said chunks further includes t bits of error correction code.

8. The memory system according to claim 7 wherein said first sequential chunk includes all of said q cache tag bits.

9. The memory system according to claim 7 wherein first through ith of said sequential chunks includes said q cache tag bits and said ith through rth of said sequential chunks includes said p data bits.

10. The memory system according to claim 7 wherein first through ith of said sequential chunks includes said q cache tag bits and an (i+1)th rough said rth of said sequential chunks includes said p data bits.

11. The memory system according to claim 7 wherein each of said modules is responsive to a receipt of said q cache bits to initiate a coherency operation.

12. The memory system according to claim 11 wherein said coherency operation is initiated prior to a receipt of all of said p data bits associated with said q cache bits.

13. The memory system according to claim 7 wherein
    each of said chunks further includes t bits of error correction code;
    a first one of said chunks additionally includes said q cache bits and s-(q+t) ones of said p data bits; and
    subsequent ones of said chunks additionally include s-t of said p data bits.

14. A method of maintaining cache memory coherency comprising the steps of:
    storing n bit data lines each including (i) p data bits and (ii) q cache tag bits corresponding to said data bits;
    arranging each of said data lines in first through r sequential chunks of s bits each wherein n, p, q, r and s are integer values greater than one, an initial portion of said sequential chunks forming one of said data lines including said p cache tag bits and a subsequent portion of said chunks including said n data bits;
    sending transactions requesting data;
    supplying data stored in a memory in response to transactions as one or more of said data lines, each data line supplied as a sequence of said sequential chunks;
    including an error correction code as part of each of said chunks.

15. The method according to claim 14 further comprising the step of receiving said first sequential chunk prior to receiving others of said sequential chunks.

16. The method according to claim 15 further comprising a step of initiating a coherency operation in response to said step of receiving said first sequential chunk and prior to a receipt of all r of said sequential chunks.

* * * * *